UNITED STATES PATENT OFFICE.

HENRI TOBLER, OF HACKENSACK, NEW JERSEY.

CREAM OF TARTAR FROM WINE-LEES.

1,278,257. Specification of Letters Patent. Patented Sept. 10, 1918.

No Drawing. Application filed November 9, 1917. Serial No. 201,042.

*To all whom it may concern:*

Be it known that I, HENRI TOBLER, a citizen of the United States, residing at Hackensack, in the county of Bergen, State of New Jersey, have invented certain new and useful Improvements in Cream of Tartar from Wine-Lees; and I do hereby declare the following to be a full, clear, and exact description of the invention, such as will enable others skilled in the art to which it appertains to make and use the same.

This invention relates to the production of cream of tartar from wine lees.

Cream of tartar is usually manufactured from argols on account of the high percentage of cream of tartar contained by this material.

Argols, moreover, are purer chemically than wine lees and the cream of tartar can be obtained with greater facility. The wine lees also contain a considerable amount of calcium tartrate which is difficult to transform into cream of tartar. Accordingly, while the unit of tartaric acid is cheaper in wine lees than in argols, the argols are commonly used instead of wine lees for the manufacture of cream of tartar.

The present invention relates to a process of extracting the cream of tartar from the wine lees and of transforming, in a simple and economical manner, all of the calcium tartrate of the wine lees into cream of tartar.

According to the present invention, the wine lees are ground and treated with the necessary amount of dilute sulfuric acid to dissolve all of the cream of tartar and to decompose all of the calcium tartrate and convert it into tartaric acid and calcium sulfate. The calcium sulfate thus formed and the insoluble constituents of the wine lees are separated by filtration from the liquid which contains, in solution, all of the tartaric acid contained in the wine lees. That is, the liquid will contain the dissolved cream of tartar and also the tartaric acid set free from the calcium tartrate by the sulfuric acid.

The reaction which takes place during this solution and decomposition may be illustrated, for example, by the following equations:

or

The solution thus obtained, after filtration from the precipitated and insoluble constituents, is treated to convert all of its tartaric acid into cream of tartar. To this end there is required one-half the equivalent amount of a potassium compound to that required by the tartaric acid set free from the calcium tartrate. The excess sulfuric acid present is also neutralized and half the free tartaric acid is neutralized by the addition of a suitable alkali. In practice, the potassium may be added in the form of potassium chlorid and the alkali in the form of sodium carbonate or caustic soda.

Assuming the liquor or solution to be that of the second equation given above, the total amount of sulfuric acid present is neutralized with an equivalent amount of sodium carbonate or caustic soda, so that the sulfuric acid is converted into sodium sulfate and the free tartaric acid and cream of tartar remain unchanged; as indicated, for example, by the following equation:

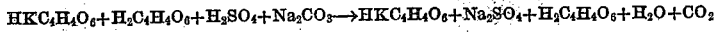

The addition of a potassium compound such as potassium chlorid or sulfate in amount sufficient to convert the free tartaric acid into cream of tartar is then made and there is also added one-half of the equivalent of caustic soda or soda ash to neutralize the free tartaric acid. As the result, the free tartaric acid is in part neutralized and combined with the potassium to form the cream of tartar or potassium acid tartrate; and this will be precipitated as well as the cream of tartar originally present as such. The conversion of the free tartaric acid into cream of tartar may be illustrated, for example, by the following equation:

As the result of these various reactions, it will be evident that there is recovered from the solution not only the cream of tartar present therein, but also an additional amount corresponding to the tartaric acid set free from the calcium tartrate by the sulfuric acid. The cream of tartar will be precipitated under the conditions of the reaction described, leaving a mother liquor containing the impurities, the sodium sulfate and chlorid, and some small amounts of cream of tartar. This mother liquor is collected, together with the washings of the cream of tartar, and is treated with a calcium salt to convert any tartaric acid or cream of tartar contained therein into calcium tartrate, this reaction being promoted by heating or otherwise, if necessary or desirable.

The calcium tartrate thus recovered from the mother liquors is added to the wine lees and the tartaric acid recovered therefrom in the subsequent carrying out of the process. When the calcium tartrate from the mother liquor is thus added to the wine lees, there should be added such further amounts of sulfuric acid as are necessary to decompose this added calcium tartrate, in addition to those used for treating the wine lees themselves. There is thus required, for decomposing the calcium tartrate, one molecular proportion of sulfuric acid for one molecular proportion of tartaric acid.

The process of the present invention may, with advantage, be carried out in the following manner:

A certain amount of wash water is introduced into a tank or decomposer provided with a mechanical stirrer or agitator and the sulfuric acid added thereto, so as to make a liquid having a density of about 10° Baumé. While the liquid is being agitated, the calcium tartrate from the mother liquor is added thereto, and finally the wine lees are added. The temperature is noted and the liquor heated, as by injection of a small amount of steam, to bring the temperature up to about 60° C. Under these conditions, a period of about three hours is usually sufficient for the treatment of a good grade of wine lees. At the end of this period, the mixture is forced through a filter press where the calcium sulfate and insoluble constituents are retained and thoroughly washed.

The liquid coming from the filter press is collected with the first strong washing in a tank provided with a direct steam jet. The liquid is about 19° Baumé and has the color of red wine. Steam is injected to bring the temperature up to about 80° centigrade and sufficient bone black added to decolorize it. Suitable reagents are added to eliminate the impurities which are to be avoided in the final product, such as sulfids to precipitate heavy metals, barium salts to precipitate sulfates, etc. The mixture is now run into a filter press and the clear decolorized liquid collected in a suitable tank or receptacle provided with a mechanical agitator.

The liquid is now tested and the required amount of potassium compound, such as potassium chlorid, is added, the amount of potassium being sufficient to form the potassium acid tartrate with the free tartaric acid contained in the liquor. The soda ash or other neutralizing agent is also added slowly with the result that the total amount of the cream of tartar is precipitated, including the cream of tartar originally present and that formed from the tartaric acid set free from the calcium tartrate.

The liquor containing the precipitated tartar is allowed to cool and settle, in a suitable wooden tank, after which the mother lees can be decanted and the cream of tartar thoroughly washed.

The cream of tartar thus produced titrates about 99.5 to 100% potassium acid tartrate and will respond to the requirements of the U. S. P.

The lees or mother liquors from which the cream of tartar has been precipitated, and any strong wash water not utilized in the further carrying out of the process, are treated with hydrated lime to precipitate any contained tartaric acid or cream of tartar in the form of calcium tartrate which may be then introduced with the wine lees in the further carrying out of the process.

I claim:

1. The method of recovering cream of tartar from wine lees, which comprises treating the lees with dilute sulfuric acid to dissolve the cream of tartar and to decompose the calcium tartrate into tartaric acid and calcium sulfate, filtering the resulting solution from the calcium sulfate and insoluble constituents, adding sufficient potassium compounds and alkali to neutralize the excess sulfuric acid and to convert the free tartaric acid into cream of tartar, and recovering the cream of tartar; substantially as described.

2. The method of recovering cream of tartar from wine lees, which comprises treating the lees with dilute sulfuric acid to dissolve the cream of tartar and to decompose the calcium tartrate into tartaric acid and calcium sulfate, filtering the resulting solution from the calcium sulfate and insoluble constituents, adding sufficient potassium chlorid and soda to neutralize the excess sulfuric acid and to convert the free tartaric acid into cream of tartar, and recovering the cream of tartar; substantially as described.

3. The method of recovering cream of tartar from wine lees, which comprises treating the lees with dilute sulfuric acid to dissolve the cream of tartar and to decompose the calcium tartrate into tartaric acid and calcium sulfate, filtering the resulting solution from the calcium sulfate and insoluble constituents, adding sufficient potassium compounds and alkali to neutralize the excess sulfuric acid and to convert the free tartaric acid into cream of tartar, separating the cream of tartar from the accompanying mother liquor, treating the mother liquor with a calcium salt to precipitate any tartaric acid compounds remaining in solution therein, and adding the precipitated calcium tartrate to the wine lees in the further carrying out of the process; substantially as described.

4. The method of recovering cream of tartar from wine lees, which comprises adding to the lees calcium tartrate recovered from the mother liquor produced in the subsequent steps of the process, treating the wine lees and the added calcium tartrate with dilute sulfuric acid to dissolve the cream of tartar and to decompose the calcium tartrate into tartaric acid and calcium sulfate, filtering the resulting solution from the calcium sulfate and insoluble constituents, adding sufficient potassium compounds and alkali to neutralize the excess sulfuric acid and to convert the free tartaric acid into cream of tartar, recovering the cream of tartar from the mother liquor, and treating the mother liquor with a calcium salt to convert any tartaric acid compounds remaining therein into calcium tartrate; substantially as described.

5. The method of recovering cream of tartar from wine lees, which comprises forming a liquor containing sulfuric acid of about 10° Baumé, adding thereto tartrate of lime and wine lees and heating to a temperature of about 60° C. with agitation of the mixture to dissolve the cream of tartar and decompose the calcium tartrate into tartaric acid and calcium sulfate, filtering the resulting solution from the calcium sulfate and insoluble constituents, adding sufficient potassium compounds and alkali to neutralize the excess sulfuric acid and to convert the free tartaric acid into cream of tartar, and recovering the cream of tartar; substantially as described.

In testimony whereof I affix my signature.

HENRI TOBLER.